Figure 1:
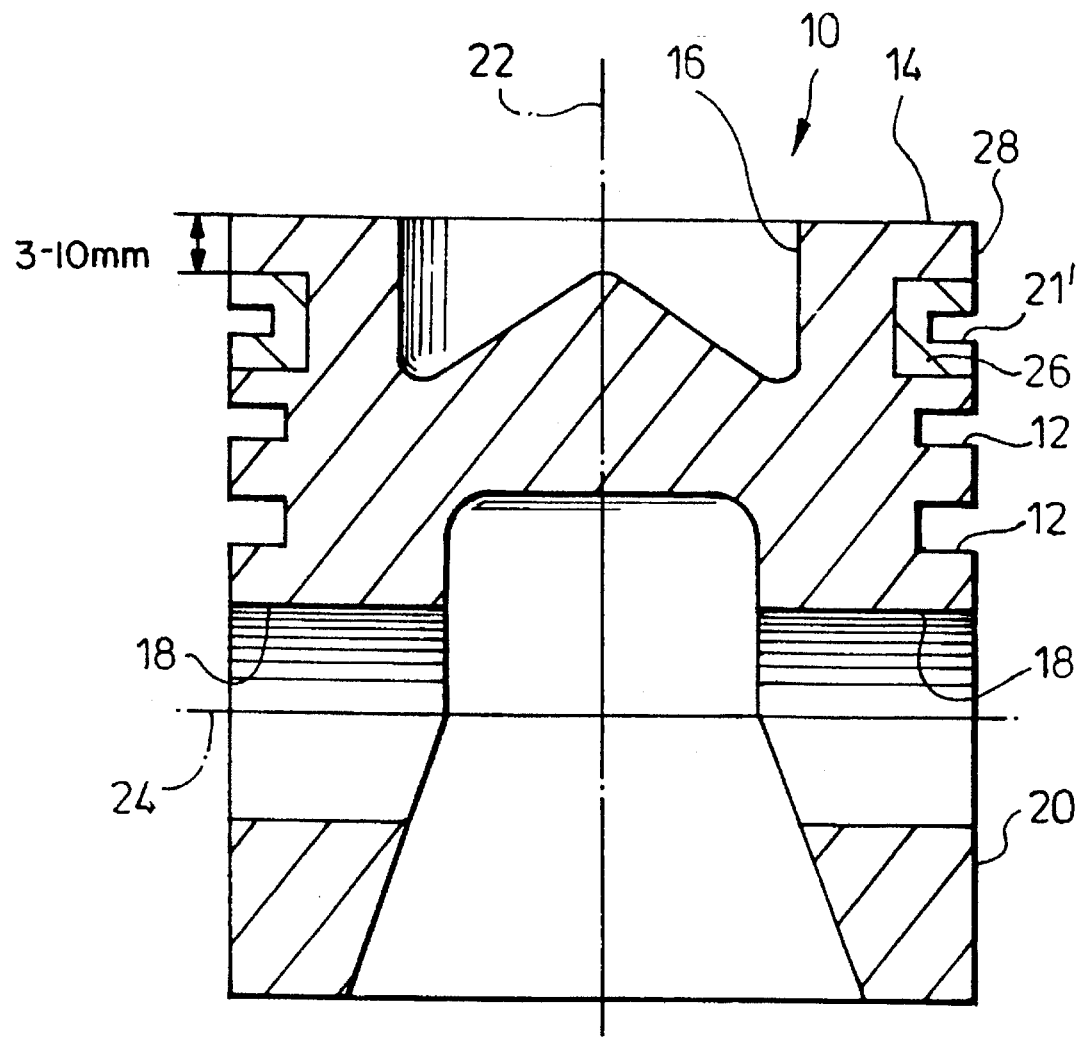

United States Patent [19]

Gazzard

[11] Patent Number: 5,505,171

[45] Date of Patent: Apr. 9, 1996

[54] REINFORCED INSERT FOR A METAL PISTON

[75] Inventor: Simon T. Gazzard, Skipton, United Kingdom

[73] Assignee: St. John's Works, West Yorkshire, England

[21] Appl. No.: 351,223

[22] Filed: Nov. 30, 1994

[30] Foreign Application Priority Data

Dec. 4, 1993 [GB] United Kingdom ............... 9324921

[51] Int. Cl.⁶ .................... F16J 1/04; F02F 3/00
[52] U.S. Cl. ............. 123/193.6; 92/208; 92/222
[58] Field of Search ............. 92/222, 208; 123/193.6

[56] References Cited

U.S. PATENT DOCUMENTS

| | | | |
|---|---|---|---|
| 2,956,846 | 10/1960 | McCullough | 92/222 |
| 3,735,746 | 5/1973 | Schieber | 123/193.6 |
| 4,008,051 | 2/1977 | Cadle | 123/193.6 X |
| 4,138,984 | 2/1979 | Steidle et al. | 123/193.6 |
| 4,292,936 | 10/1981 | Morishata et al. | 123/193.6 |
| 4,336,077 | 6/1982 | Leach et al. | 92/222 X |
| 4,432,313 | 2/1984 | Matlock | 123/193.6 |
| 4,498,219 | 2/1985 | Ban et al. | 92/212 X |
| 4,548,126 | 10/1985 | Donomoto et al. | 92/212 X |
| 4,643,078 | 2/1987 | Ban | 92/212 |
| 4,658,706 | 4/1987 | Sander et al. | |
| 4,677,901 | 7/1987 | Ban et al. | 123/193.6 X |
| 4,704,950 | 11/1987 | Ripberger et al. | 92/208 |
| 4,708,104 | 11/1987 | Day et al. | 123/193.6 |
| 4,889,557 | 12/1989 | Iwata et al. | |
| 4,975,243 | 12/1990 | Scott et al. | 420/534 |
| 4,987,867 | 1/1991 | Suzuki et al. | 123/193.6 |
| 5,013,610 | 5/1991 | Suzuki | 123/193.6 X |
| 5,081,967 | 1/1992 | Kemnitz et al. | 92/208 X |
| 5,115,770 | 5/1992 | Yen et al. | 123/193.6 |
| 5,119,777 | 6/1992 | Mielke et al. | 123/193.6 |
| 5,146,883 | 9/1992 | Reipert et al. | 92/212 X |

FOREIGN PATENT DOCUMENTS

| | | | |
|---|---|---|---|
| 0063258 | 10/1982 | European Pat. Off. | |
| 0188704 | 7/1986 | European Pat. Off. | |
| 2286989 | 4/1976 | France | 123/196.6 |
| 0375473 | 6/1990 | France | |
| 205719 | 1/1984 | Germany | 123/193.6 |
| 3235165 | 3/1984 | Germany | 123/193.6 |
| 3330554 | 3/1985 | Germany | 123/193.6 |
| 3532308 | 3/1987 | Germany | 123/193.6 |
| 1-117970 | 5/1989 | Germany | 123/193.6 |
| 4402090 | 7/1994 | Germany | 123/193.6 |
| 56-132439 | 10/1981 | Japan | 123/193.6 |
| 57-210140 | 12/1982 | Japan | 123/193.6 |
| 58-91350 | 5/1983 | Japan | 123/193.6 |
| 58-101249 | 6/1983 | Japan | 123/193.6 |
| 60-175748 | 9/1985 | Japan | 123/193.6 |
| 60-173346 | 9/1985 | Japan | 123/193.6 |
| 63-71553 | 3/1988 | Japan | 92/212 |
| 63-255550 | 10/1988 | Japan | 123/193.6 |
| 1-41648 | 2/1989 | Japan | 123/193.6 |
| 6-159133 | 6/1994 | Japan | 123/193.6 |
| 2023765 | 1/1980 | United Kingdom | 123/193.6 |

OTHER PUBLICATIONS

*Patent Abstracts of Japan*, vol. 013, No. 479, 18 Oct. 1989 & JP-A-01 188639 (Hitachi Metals Ltd.) 27 Jul. 1989 (Abstract).

Chemical Abstracts, Vol. 106, No. 18, May 1987, No. 142453, Tanaka, et al "Fiber-Reinforced Composites."

*Primary Examiner*—John E. Ryznic
*Attorney, Agent, or Firm*—Nixon & Vanderhye

[57] ABSTRACT

A piston for an internal combustion engine, and particularly, but not exclusively, for a Diesel engine, has in a region thereof reinforcing ceramic fibres, the fibres originally being in the form of an insert for the piston with a relatively high density in the range 10 to 20% of the density of the fibre material. In the fabrication of the piston the insert is infiltrated with molten piston material, the piston being formed by employing a pressure casting technique, such as squeeze casting. The piston material comprises an aluminum alloy with 2.0 to 5.5% by weight copper and with 11.0 to 17.0% by weight silicon, and, preferably, 2.5 to 3.5% by weight copper and 12 to 14% by weight silicon. In the fibre-reinforced region the top ring groove of the piston is provided, and, possibly, the fibre-reinforced piston region provides the peripheral part of the crown surface.

11 Claims, 2 Drawing Sheets

REINFORCED INSERT FOR A METAL PISTON

The present invention relates to fibre-reinforced metal pistons for internal combustion engines, especially Diesel engines, and, in particular, the present invention relates to metal pistons each having reinforcing ceramic fibres in the region of the piston in which the top ring groove is provided; and the piston is of a cast aluminum alloy, the metal having infiltrated the fibre reinforcement when the piston is cast by employing a pressure technique such as squeeze casting.

A ceramic fibre reinforcement increases the strength of a piston region in which it is provided; and also enables the region to withstand greater temperatures than otherwise would be the case. The greater the density of the fibre insert initially included in the piston region in relation to the density of the fibre material the stronger the provided region.

In operation, or in post-casting heat treatment process steps, such as solution heat treating and quenching, such a piston may crack due to differential thermal expansion at the boundary between the fibre-reinforced region and an adjacent region which is not so reinforced. This cracking is more likely to occur when the fibre insert initially included in the former region has a relatively high density, say, in the range 10 to 20% of the density of the fibre material.

Conventionally the reinforcing ceramic fibres in a piston are of aluminium oxide and/or of aluminium silicate, and, in the fibre insert, before the piston is cast, the fibres have a thin coating of silica provided by drying an appropriately shaped preform of the combination of the fibres with a binder system including silica gel. During the subsequently required pressure casting of the piston, the molten aluminium alloy comprising the piston material may react with the silica coated fibre surfaces and becomes bonded thereto. In any event, micro-shrinkage of the cast piston material occurs, and this tends to break any bond between the aluminium alloy and the fibres, or otherwise causes the fibres to become less securely held in the aluminium alloy. This causes the wear resistance of the fibre-reinforced piston region to be significantly lower than otherwise would be the case.

Whilst it is known that a relatively high density fibre insert has been incorporated into a piston so as to provide the crown surface, previously it has not been considered desirable to include such a relatively high density fibre insert in the region of a piston providing a top ring groove because it causes the machining of the groove to be more difficult, and causes increased wear of the piston ring in the groove, in addition to increased wear associated with the groove.

For pistons to be included in highly rated engines, especially, but not exclusively, Diesel engines, it is desirable to provide top ring grooves in piston regions of a material which has a high wear resistance. Conventionally, at least the top ring groove is provided in a Ni-resist insert which has a desirable high wear resistance. However, the Ni-resist insert can not be subjected to temperatures greater than 270° C., lower than temperatures to which it may be subjected in a highly rated engine. Where higher temperatures are to be experienced in a piston region a relatively high density fibre insert conveniently can be included in this region instead of the piston region comprising a Ni-resist insert.

It is an object of the present invention to provide a piston for an internal combustion engine which has a relatively high density fibre insert included in the piston region providing the top ring groove, and this piston region having a high wear resistance.

According to the present invention a piston for an internal combustion engine has in a region thereof reinforcing ceramic fibres, the fibres originally being in the form of an insert for the piston with a relatively high density in the range 10 to 20% of the density of the fibre material, in the fabrication of the piston the insert being infiltrated with molten piston material, the piston being formed by employing a pressure casting technique, such as squeeze casting, the piston material comprises an aluminium alloy with 2.0 to 5.5% by weight copper and with 11.0 to 17.0% by weight silicon, and, preferably, 2.5 to 3.5% by weight copper and 12 to 14% by weight silicon, and in the fibre-reinforced region the top ring groove of the piston is provided.

Any such an aluminium alloy material has a greater hot strength than aluminium alloys with a lower amount of copper, and provides, in the operation of the piston, a stronger matrix to hold the reinforcing ceramic fibres than is provided with aluminium alloys having a lower amount of copper.

Further, advantageously, an aluminium alloy having 2.0 to 5.5% by weight of copper is more compatible with the piston ring to be provided in the groove.

Because of either, or both, the criteria referred to in the two preceding paragraphs there is obtained required reduced wear of the piston ring, in addition to the obtaining of desirable reduced wear of the ring groove, in the operation of the piston.

In addition, because of the higher hot strength of the aluminium alloy having 2.0 to 5.5% by weight copper, compared with an alloy having a lower percentage of copper, it is possible to provide the top ring groove closer to the crown surface, where the operating temperature is higher than otherwise would be the case, and where this operating temperature is higher than is desirable for a Ni-resist insert. Thus, the axial length of the top piston land can be smaller than is possible with a Ni-resist insert. Such a piston arrangement with a short piston land is advantageous because, in an engine, the "dead volume" above the top ring, and which dead volume is in communication with the combustion volume above the piston, is smaller than otherwise would be the case. The reduction in the dead volume causes a corresponding, and advantageous, reduction in undesirable exhaust emissions, an improvement in the fuel consumption of the engine, and a longer life.

The piston arrangement may be such that the fibre-reinforced piston region in which the top ring groove is provided also provides the peripheral part of the crown surface. Hence, the top piston land is solely provided by the fibre-reinforced piston region, and desirably may be of smaller axial extent than otherwise is possible.

The present invention will now be described by way of example, with reference to the accompanying drawings, in which FIG. 1 is a sectional elevation of one embodiment of a piston in accordance with the present invention, the illustrated section being in the plane including both the piston axis and the axis of the gudgeon pin bores, and FIG. 2 corresponds to FIG. 1 and shows a modification of the piston of FIG. 1.

The piston 10 of FIG. 1 for a Diesel engine is produced by squeeze casting an aluminium alloy comprising:

| | |
|---|---|
| Copper | 2.5% by weight |
| Silicon | 13.5% by weight |
| Nickel | 1.0% by weight |
| Magnesium | 1.0% by weight, and | the balance being aluminium and both significant and insignificant impurities.

The ultimate tensile strength of this alloy at 350° C. is 70 MegaPascals.

The illustrated piston is provided with three ring grooves 12, but any desired number of such ring grooves may be provided. The crown surface is indicated at 14, and a combustion bowl 16 is formed in this crown surface. Gudgeon pin bores 18 extend through bosses provided in the piston below the ring grooves 12. The piston skirt is indicated at 20. Also shown in the drawing is the piston axis 22 and the axis 24 of the gudgeon pin bores 18.

An insert (not shown) of reinforcing ceramic fibres, for example, the fibres being of alumina, is incorporated in the piston 10 in the squeeze casting process step. In particular, the fibre insert is located at a required position in the casting mould, and, under the application of externally applied pressure, molten aluminium alloy of the composition referred to above is caused to infiltrate the fibre insert. The arrangement is such that an annular fibre-reinforced piston region 26 is provided, and in this piston region is provided the top ring groove 12'.

The piston is for a highly rated Diesel engine, and the top ring groove 12' is so located in relation to the crown surface 14 that the top piston land 28, whilst having a finite axial length, has an advantageously small axial length of less than 10 millimetres between the top ring groove 12' and the periphery of the crown surface 14. This axial length, may be in the range 3 to 10 millimetres, and, conveniently, may be in the range 5 to 9 millimetres. Any such small axial length for the top piston land, previously, would have implied a high tendency for the land to break under normal operating conditions for the piston. However, in accordance with the present invention, the combination of an aluminium alloy with a high hot strength, infiltrating a relatively high density ceramic fibre, reinforcing insert, ensures that breakage of the top piston land does not occur. For example, this land has an axial length of 8.5 millimetres. Because of any such location of the top ring groove 12' the temperatures to which the piston region 26 are subjected may be higher than 270° C., unsuitable for Ni-resist material which conventionally is used for such a piston region.

The fibre insert incorporated into the piston had a relatively high density of 15% of the density of the fibre material. Because of this high density, because of the high hot strength of the aluminium alloy referred to above, because of the improved compatibility of the alloy with the piston ring, and because of the inherent high strength support provided by the aluminium alloy for the reinforcing alumina fibres, there is a desirable high wear resistance for the piston region 26, and a reduced wear rate of the piston ring included in the groove provided in the region.

Figure 2:
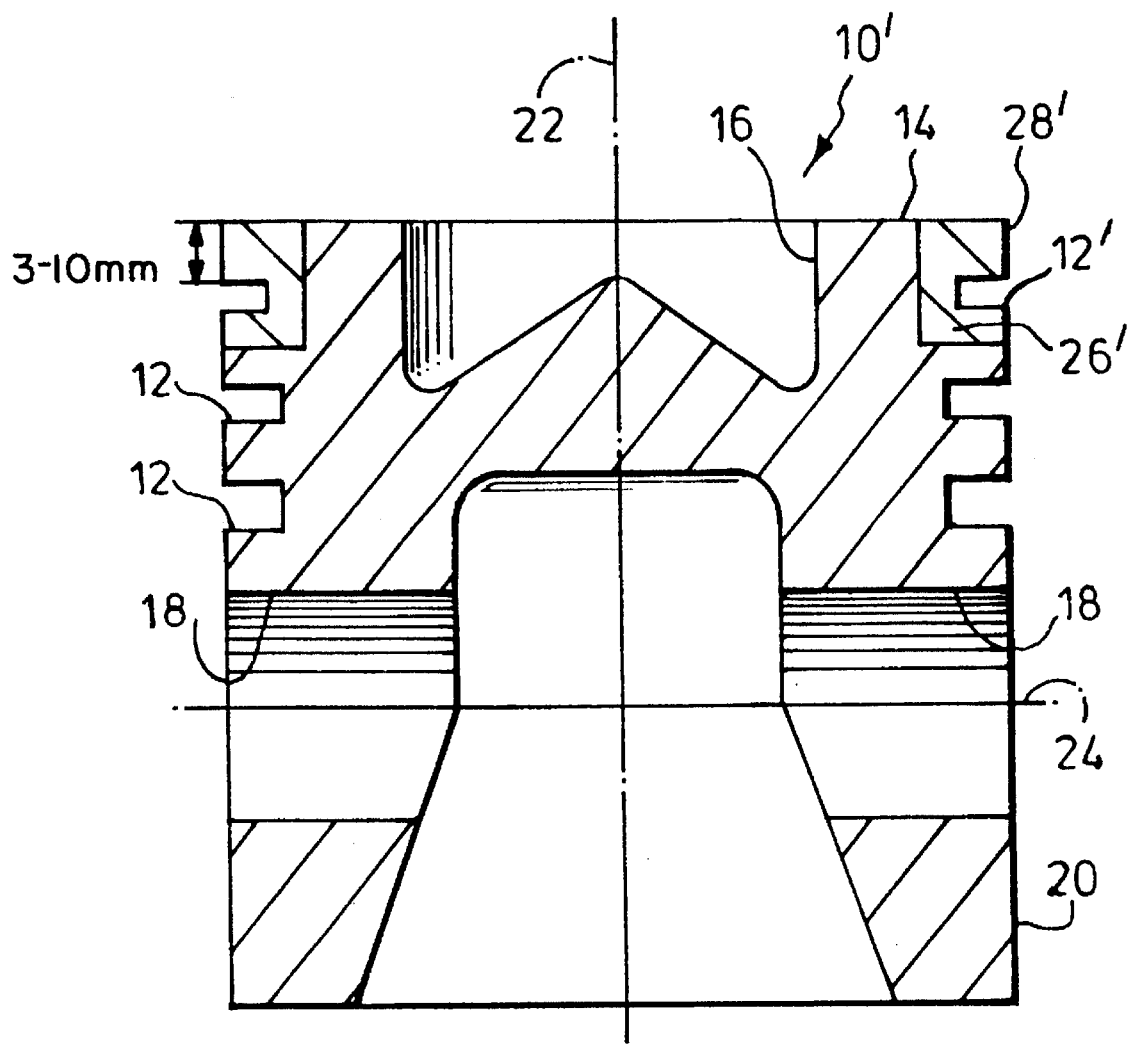

A modification of the piston of FIG. 1 is shown in FIG. 2, and where appropriate the same reference numerals are used in both Figures to identify identical or closely resembling parts.

The piston 10' of FIG. 2 differs from that of FIG. 1 in that the annular fibre-reinforced region 26', in addition to having the top ring groove 12' formed therein, also extends to the peripheral part of the crown surface 14, and provides the whole of the top piston land 28'. This modification enables the top piston land 28', and the piston 10', to be of smaller axial extent than otherwise is possible.

I claim:

1. A piston for a Diesel engine having in a region thereof reinforcing ceramic fibers, the fibers originally being in the form of an insert for the piston with a relatively high density in the range 10 to 20% of the density of the fiber material, in the fabrication of the piston the insert being infiltrated with molten piston material, the piston being formed by employing a pressure casting technique, the piston material comprising an aluminum alloy with 2.0 to 5.5% by weight copper and with 11.0 to 17.0% by weight silicon, and in the fiber-reinforced region the top ring groove of the piston is provided in which the axial length of the land between the top ring groove and the periphery of the crown surface of the piston is between 3 and 10 millimeters.

2. The piston as claimed in claim 1 in which the axial length of the land between the top ring groove and the periphery of the crown surface of the piston is between 5 and 9 millimeters.

3. The piston as claimed in claim 1 in which the aluminum alloy contains 2.5 to 3.5% by weight copper.

4. The piston as claimed in claim 1 in which the aluminum alloy contains 12 to 14% by weight silicon.

5. The piston as claimed in claim 1 in which the piston material comprises:

| | |
| --- | --- |
| copper | 2.5% by weight |
| silicon | 13.5% by weight |
| nickel | 1.0% by weight |
| magnesium | 1.0% by weight | with the balance being aluminum and both significant and insignificant impurities.

6. A piston for an internal combustion engine has in a region thereof reinforcing ceramic fibers, the fibers originally being in the form of an insert for the piston with a relatively high density in the range 10 to 20% of the density of the fiber material, in the fabrication of the piston the insert being infiltrated with molten piston material, the piston being formed by employing a pressure casting technique, the piston material comprises an aluminum alloy with 2.0 to 5.5% by weight copper and with 11.0 to 17.0% by weight silicon, the fiber-reinforced piston region provides the peripheral part of the crown surface, and in the fiber-reinforced region the top ring groove of the piston is provided in which the axial length of the land between the top ring groove and the periphery of the crown surface of the piston is between 3 and 10 millimeters.

7. The piston as claimed in claim 6 in which the axial length of the land between the top ring groove and the periphery of the crown surface of the piston is between 5 and 9 millimeters.

8. The piston as claimed in claim 6 in which the aluminum alloy contains 2.5 to 3.5% by weight, copper.

9. The piston as claimed in claim 6 in which the aluminum alloy contains 12 to 14% by weight silicon.

10. The piston as claimed in claim 6 in which the piston material comprises:

| | |
| --- | --- |
| Copper | 2.5% by weight |
| Silicon | 13.5% by weight |
| Nickel | 1.0% by weight |
| Magnesium | 1.0% by weight | with the balance being aluminum and both significant and insignificant impurities.

11. A piston for an internal combustion engine has in a region thereof reinforcing ceramic fibers, the fibers originally being in the form of an insert for the piston with a relatively high density in the range 10 to 20% of the density of the fiber material, in the fabrication of the piston the insert being infiltrated with molten piston material, the piston being formed by employing a pressure casting technique, the piston material comprises an aluminum alloy with 2.0 to 5.5% by weight copper and with 11.0 to 17.0% by weight silicon, the fiber-reinforced piston region provides the peripheral part of the crown surface, and in the fiber-reinforced region the top ring groove of the piston is provided in which the axial length of the land between the top ring groove and the periphery of the crown surface of the piston is between 3 and 10 millimeters.

* * * * *